No. 12,509.

REISSUED JULY 24, 1906.

A. LIPSCHUTZ.

JOURNAL BOX LID.

APPLICATION FILED APR. 9, 1906.

3 SHEETS—SHEET 1.

Witnesses

Edgar T. Farmer.

Nelle L. Church.

Inventor:

Arthur Lipschutz by Bakewell & Cornwall

Att'y's.

THE NORRIS PETERS CO., WASHINGTON, D. C.

No. 12,509. REISSUED JULY 24, 1906.

A. LIPSCHUTZ.

JOURNAL BOX LID.

APPLICATION FILED APR. 9, 1906.

3 SHEETS—SHEET 2.

Witnesses

Edgar T. Farmer

Nelle L. Church.

Inventor:

Arthur Lipschutz by

Bakewell & Cornwall

Atty's.

THE NORRIS PETERS CO., WASHINGTON, D. C.

No. 12,509. REISSUED JULY 24, 1906.
A. LIPSCHUTZ.
JOURNAL BOX LID.
APPLICATION FILED APR. 9, 1906.
3 SHEETS—SHEET 3.
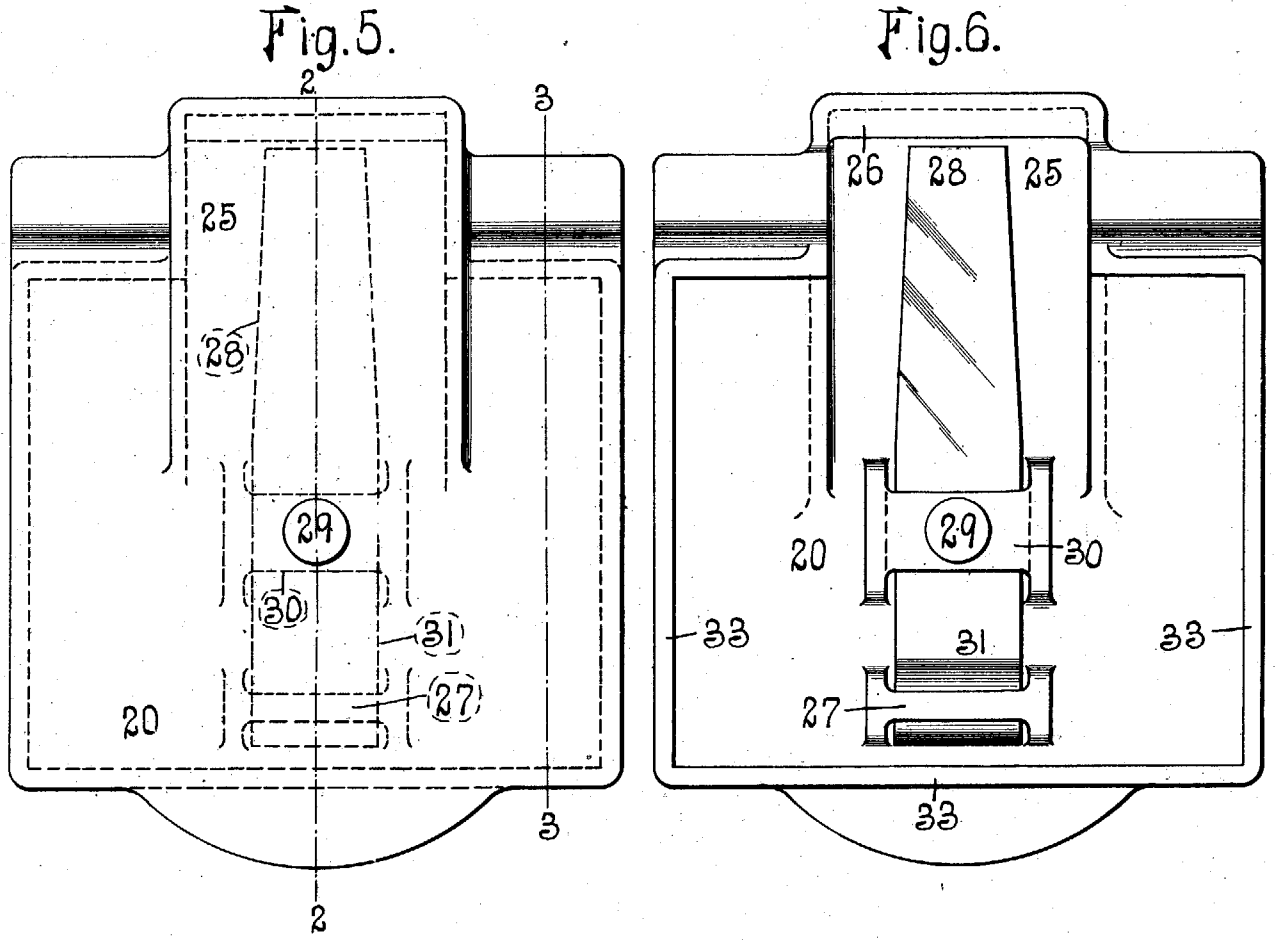
Witnesses
Edgar T. Farmer
Wells L. Church
Inventor:
Arthur Lipschutz
by Bakewell & Cornwall
Atty's.
THE NORRIS PETERS CO., WASHINGTON, D. C.

UNITED STATES PATENT OFFICE.

ARTHUR LIPSCHUTZ, OF CHICAGO, ILLINOIS.

JOURNAL-BOX LID.

No. 12,509. Specification of Reissued Letters Patent. Reissued July 24, 1906.

Original No. 813,504, dated February 27, 1906. Application for reissue filed April 9, 1906. Serial No. 310,880.

*To all whom it may concern:*

Be it known that I, ARTHUR LIPSCHUTZ, a citizen of the United States, residing in the city of Chicago and State of Illinois, have invented a certain new and useful Improvement in Journal-Box Lids, of which the following is a full, clear, and exact description, such as will enable others skilled in the art to which it appertains to make and use the same, reference being had to the accompanying drawings, forming part of this specification.

My invention relates more particularly to a lid or cover for journal-boxes of the type usually employed on railway-cars, and has for its object to provide a box adapted to be closed as completely as possible against the admission of dust or other objectionable matter.

Figure 1:
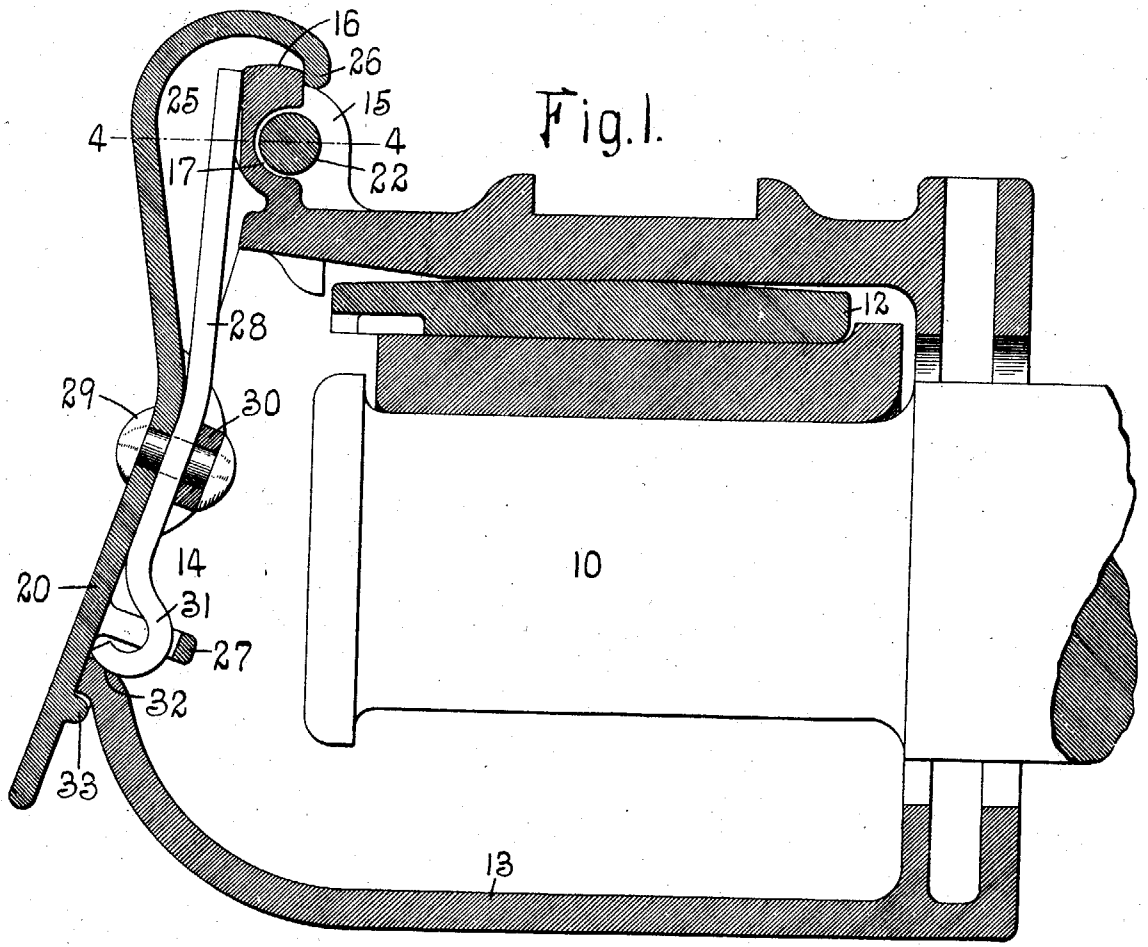
Figure 2:
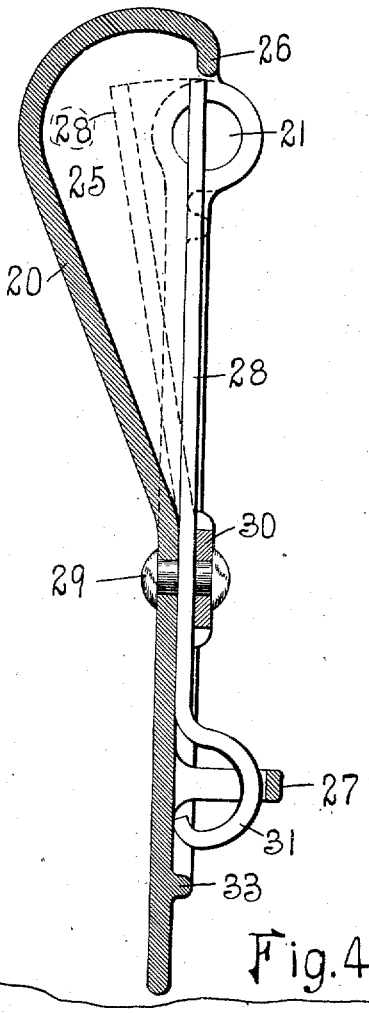
Figure 3:
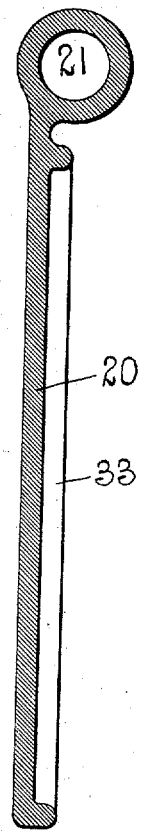
Figure 4:
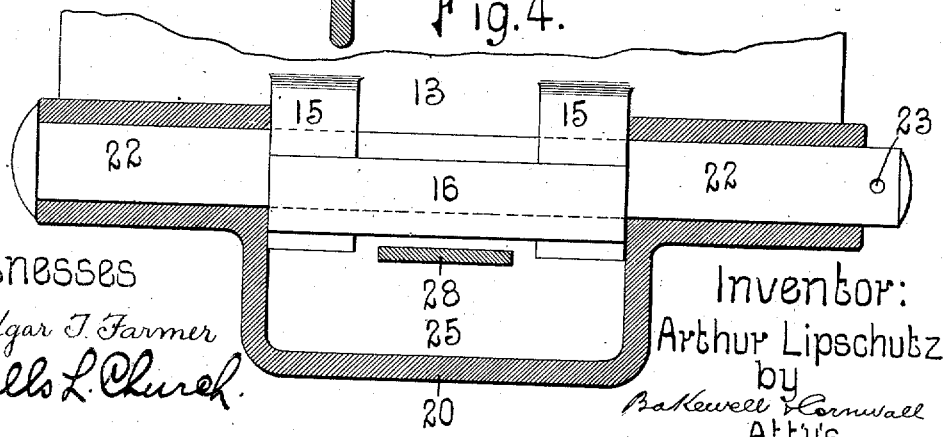

In the drawings, which show a journal-box and lid embodying my invention, Figure 1 is a longitudinal section of the box with the lid attached. Fig. 2 is a cross-section of the lid on the line 2 2 of Fig. 5. Fig. 3 is a cross-section of the lid on the line 3 3 of Fig. 5. Fig. 4 is a horizontal section on the line 4 4 of Fig. 1, and Figs. 5 and 6 are respectively a front and rear elevation of the lid.

Like characters of reference refer to similar parts in the different views.

10 is the journal; 11, the brass; 12, the key, and 13 the journal-box, provided with the usual opening 14. At the upper edge of this opening the box is provided with two perforated lugs 15, which constitute the hinge-pin lugs for the lid. Between these two lugs is formed a flange 16, grooved on its inner side, as shown at 17, for the passage of the hinge-pin. This flange extends upward, as best shown in Figs. 1 and 4, beyond the top of the lugs 15 and laterally over or across the top of said lugs, as best shown in Fig. 4. The lid 20 is provided with two openings 21. A hinge-pin 22 passes through these openings and through the perforations in the lugs 15, traversing the groove 17 in the rear face of the flange 16, and is secured in position by means of the usual cotter-pin 23. The lid is also provided with the usual forwardly and upwardly extending portion 25, the rear edge of which is curved downward to form a lip 26. The lid is also provided with a spring 28, secured thereto by means of a rivet 29, set in a yoke 30, formed integral with the lid and beneath which the spring 28 passes. The lower end of the spring 28 is bent to form a hook 31, the outer end of which engages with a notch 32, adjacent to the opening 14 of the box, to form a lock. 27 is a second yoke, also formed integral with the lid and embracing the hook 31, for which it acts as a stop. The lid is also provided with a rib 33, which conforms to the shape of the opening 14 of the box.

When the lid is detached from the box, the upper end of the spring 28 occupies the position shown in full lines in Fig. 2; but when the lid is in closed position on the box the upper end of this spring 28 occupies the position shown in full lines in Fig. 1 and in dotted lines in Fig. 2 and tends to hold the lid closed. The lid is also held closed by the engagement of the hook 31 at the opposite end of this spring in the notch 32. It will be seen from an inspection of Fig. 1 that when the lid is in closed position the lip 26 on the lid is in contact with the inner or rear face of the flange 16, which is extended upward to a sufficient extent to insure the closing of the box at this point, thus preventing the entry of dust. At the same time the hook 31 insures the firm engagement of the lid with the box. When the lid is raised, the stop 27 engages the hook 31 and forces it from the notch 32, thus unfastening the lid.

It will be seen that by means of this construction the hinge-pin is exposed to view on the rear face of the flange at the top of the box, thus permitting ready inspection to ascertain whether the pin has been broken.

Having fully described my invention, what I claim as new, and desire to secure by Letters Patent of the United States, is—

1. The combination with a journal-box provided with an opening, of a hinged lid for said opening, a spring connected to said lid intermediate its ends and bearing at one end against said box, the other free end of said spring engaging with said box to hold said lid in position, and means for rigidly holding said spring in place.

2. The combination with a journal-box provided with an opening, of a lid for said opening, a spring carried by said lid and bearing at one end against the upper portion of said box, the other end of said spring forming a lock which engages the lower portion of said box to hold said lid in position, and a stop for said spring adjacent to said lock.

3. The combination with a journal-box provided with an opening, of a hinged lid for said opening, a spring carried by said lid and bearing at one end against said box, means securing said spring to said lid at a point intermediate the ends of said spring and holding it rigidly in place, the opposite end of said spring engaging with said box adjacent to said opening to hold said lid in position.

4. The combination with a journal-box, provided with hinge-pin lugs and a flange on said box between said lugs, said flange being provided with a groove on its rear face, of a hinge-pin passing through said lugs and groove, a lid journaled on said hinge-pin and provided with a lip making contact with said flange, and a spring carried by said lid and bearing at one end against said box, the opposite end of said spring engaging with said box to hold said lid in position.

5. The combination with a journal-box provided with an opening, of a pivotally-mounted lid for said opening, a spring connected to the lid intermediate its ends and rigidly held in position, one end of said spring bearing against the upper portion of said box and the other end of said spring engaging the lower portion of said box to hold said lid in position.

6. The combination with a journal-box provided with an opening, of a lid for said opening, a yoke-shaped member rigidly connected to said lid, and a spring extending through said yoke-shaped member and bearing at one end against said box, the other end of said spring engaging a portion of said box to hold said lid in position.

7. The combination with a journal-box provided with an opening, of a lid for said opening, a spring carried by said lid and bearing at its upper end against said box, the lower end of said spring engaging a portion of said box to hold said lid in position, and a yoke-shaped stop connected to the lid and surrounding the lower end of said spring.

8. The combination with a journal-box provided with an opening, of a pivotally-mounted lid for said opening, a spring carried by said lid and having both of its ends free, the upper end of the spring bearing against the box, and the lower end of said spring engaging a portion of said box to hold the lid closed, and means for preventing the spring from being turned or rotated relatively to the lid.

9. The combination with a journal-box provided with an opening, of a lid closing said opening and provided with a yoke, a spring extending through said yoke, a fastening device passing through the lid, the spring, and the yoke, one end of said spring bearing against said box and the other end of said spring engaging a portion of said box to hold said lid in position.

10. The combination with a journal-box provided with an opening, of a lid for said opening provided with a rib which engages the outside of the journal-box at the lower edge of said opening, and a spring rigidly connected intermediate its ends to the lid and bearing at its upper end against said box, the lower end of said spring being provided with a curved portion, and said box being provided at the lower edge of the opening with a notch to receive the curved portion of the spring and thereby lock the lid in position.

In testimony whereof I hereunto affix my signature, in the presence of two witnesses, this 2d day of April, 1906.

ARTHUR LIPSCHUTZ.

Witnesses:
M. SIMON,
H. H. GROSS.